Dec. 28, 1926.
W. P. BUTT
1,611,995
SWITCH FOR AUTOMOBILE HORNS
Filed Dec. 17, 1924
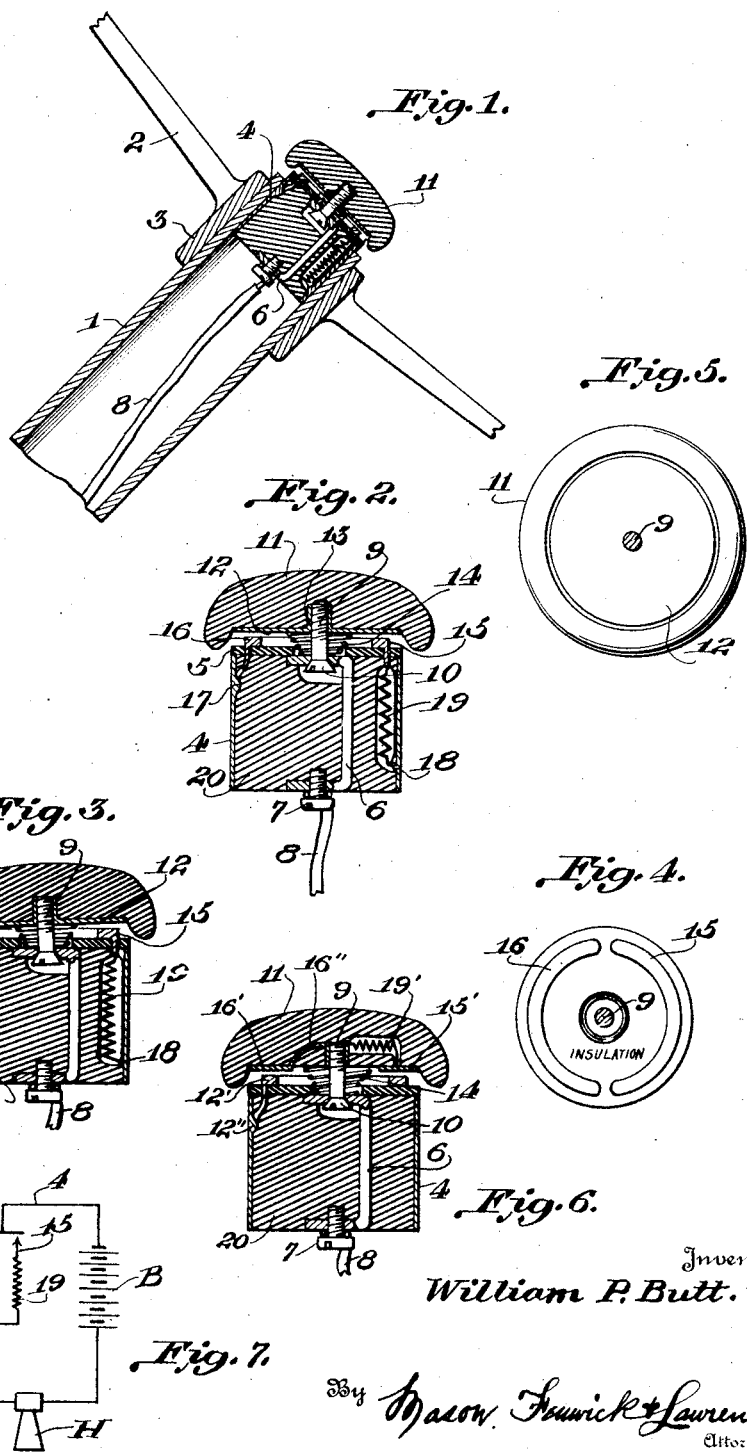
Inventor
William P. Butt.

Patented Dec. 28, 1926.

1,611,995

UNITED STATES PATENT OFFICE.

WILLIAM P. BUTT, OF NORFOLK, VIRGINIA, ASSIGNOR OF ONE-HALF TO EDWARD J. BRICKHOUSE, OF NORFOLK, VIRGINIA.

SWITCH FOR AUTOMOBILE HORNS.

Application filed December 17, 1924. Serial No. 756,575.

This invention relates to an improved switch which will permit the horn of an automobile to be sounded in different degrees of intensity, and has for its object to provide a switch of simple and efficient construction for the purpose indicated. The improvement embodies a base or supporting member preferably of a type which will permit the same to be placed in the center of the steering wheel in the steering wheel column, said base having pivotally and tiltably mounted thereon a cap which may be tilted toward the base when it is desired to establish electrical connection with the horn circuit. The various features of novelty and invention will appear from the detailed description taken in connection with the accompanying drawings forming part of this specification.

Referring to the drawings:

Fig. 1 is a sectional view taken through the preferred form of switch, the same being shown mounted at the upper part of the steering column.

Fig. 2 is a section on an enlarged scale through the switch.

Fig. 3 is a view similar to Fig. 2, showing the cap as tilted to establish contact with one branch over one circuit.

Fig. 4 is a plan view of the top of the base member showing two arcuate contact strips forming part of the switch.

Fig. 5 is a bottom plan view of the cap member.

Fig. 6 is a modified form of the switch.

Fig. 7 is a diagrammatic view illustrating the horn circuit.

Numeral 1 indicates the upper portion of the steering column, 2 the spokes of the steering wheel, and 3 the hub of the same within which the steering column is received and secured. The base of the switch member is shown as comprising a metallic shell 4 having a top member 5 made of suitable insulating material. Within the shell 4 is a conductor 6 in the form of a U-shaped bar, one leg of which is threaded to receive a binding screw 7 for securing the terminal of a battery wire 8. The other leg of the bar 6 is disposed below the top member 5 and has a beveled opening therein through which is passed the body 9 of a beveled screw, the head 10 of the screw being adapted to rock in its seat in the leg of the bar 6 as will be readily understood. A cap 11 is fixed on the end of the screw 9, said cap having a plate 12 on its bottom face with which said screw engages. As shown, the plate is preferably provided with a socket 13 which extends into the body of the cap, the screw being entered into the socket. It will now be seen that the wire 8 is in direct electrical connection with the plate 12 on the cap 11. In order to afford a more positive electrical connection between the plate 12 and the bar 6 to which the wire 8 is attached, the top member 5 has a central cutout to permit a helical spring 14 to be seated on the adjacent leg of the said bar, the other end of the spring making contact with the plate 12. The primary purpose of the spring is to hold the cap 11, or rather the plate 12 thereof, away from the contact members on the base, as will presently appear. As already indicated, the spring also serves as a means for establishing a positive electrical connection between the plate and the bar 6. This arrangement of the spring between the cap and the base is a valuable feature, inasmuch as it insures a direct electrical connection between the plate 12 and the bar 6 even though there should occur a gap between the screw 9 or the head 10 of the same and the leg of the bar 6, such gap being caused by looseness of the parts with wear or during the tilting of the cap.

Mounted on the top member 5 of the base is a pair of arcuate contact strips 15 and 16, said members being concentrically mounted with respect to the screw 9 and having their terminals in close proximity. The contact strip 15 is electrically connected with the shell 4, as at 17, and the contact strip 15 as at 18. A resistance element 19 is provided between contact strip 15 and its point of connection with the shell 4, as at 18 in order that less current will flow through the switch when the plate 12 is brought into contact with the said contact strip 15. It is customary in automobile circuits to constitute the metallic framework as the ground, and the drawing therefore illustrates only one lead from the battery, the said lead being indicated by the conductor 8. It will now be seen that when the plate 12 is tilted or pressed against one or the other of the contact strips 15 and 16, the current will flow from the conductor 8 to the plate 12 on the cap by way of the screw 9 and spring 14, and will flow from the plate 12 to the shell 4 by way of one or the other of the contact strips 15 and 16, the shell 4 constituting a common conductor for both of the contact strips. The current flowing by way of the contact strip 15 will be less than that flowing through the contact strip 16 by reason of the resistance element 19 between the contact strip 19 and the shell 4. It follows, therefore, that less current will be supplied to the horn of the automobile, said horn being generally indicated by "H" and the battery by "B," the other elements of the circuit being indicated by reference characters corresponding to the elements previously referred to. After the switch has been assembled the shell 4 will or may be filled with a suitable insulating material as will be readily understood.

A modification of the invention is shown in Fig. 6. The arcuate contact members 15 and 16 instead of being mounted in the base as shown in Fig. 2 are mounted on the cap 11 as indicated at 15' and 16', the resistance element 19 by virtue of this rearrangement of parts being mounted within the cap 11 as indicated at 19', one end of the resistance element being connected to the metallic collar 13' in the cap and within which collar the screw 9 is received. A suitable conductor 16'' is also provided between said collar 13' and the arcuate contact member 16'. The member corresponding to the plate 12 is in the nature of a ring 12' which is electrically connected as at 12'' to the shell 4. In this modification as well as in the preferred form, less current will flow to the conductor or shell 4 when contact is made between the contact strip 15' and the ring 12' by reason of the resistance 19' than will flow to said shell 4 when contact is made between the arcuate strip 16' and the said ring 12'.

By placing the ends of the arcuate contact strips in close proximity, as shown in Fig. 4, there is no liability to a blind spot or gap occurring when the cap 12 is tilted toward the contact strips. It will also be apparent that the switch is so constructed that the cap may be pressed directly downward upon both of said strips, in which event the horn is sounded at its maximum intensity inasmuch as current will flow through the circuit of least resistance; namely, by way of the contact strip 16.

From the above it will be seen that I have devised a simple but effective form of switch permitting the horn to be sounded at different degrees of intensity. The working parts are relatively few and not liable to get out of order. Furthermore, continuous electrical connection is always insured between the base and cap by reason of the helical spring 14.

In operation, the purpose of the resistance element being to reduce the amount of current passing through the conductor strip and so cause an electrical instrument to be less active when current is placed to it through this connection, as for example, causing an automobile horn to give two separate and distinct tones when circuit is made through first one contact strip and then the other, the construction allowing either contact to be made at will without having to give the other.

What I claim is:

1. An electric switch comprising a metallic shell adapted to be positioned in the upper end of a steering wheel post, a core of non-conducting material seated in said shell, a conductor bar embedded in said core lengthwise of said shell and having one end thereof extending along one face of said core, spaced semi-circular conductor strips on said face, electrical connections between said strips and shell, one of said connections including a resistance, a button having a metallic conductor face, yielding conducting means in contact with said conductor face for universally pivoting said button above said strips with its conductor face normally out of contact with said strips and means electrically connecting said yielding means to a source of electrical energy.

2. An electric switch comprising a metallic cylindrical shell having a non-conducting core, two arcuate metallic contact strips on said core having their ends in close proximity to each other, and electrical connection between one of said strips and said shell, a resistance element electrically connecting the other strip to said shell, a cap pivoted for universal movement above said contact strips and having a metallic conductor plate on the face thereof opposed to said strips, a conducting spring normally holding said cap with its plate out of contact with said strips, and means including a part embedded in said core for electrically connecting said spring to a source of electrical energy.

3. In an electric switch, an annular contact, two arcuate contacts insulated from each other, a resistance connected to one of said arcuate contacts, and operating means connected with said contact and contacts and having a rectilinear and tilting movement to cause the annular contact to engage both of said arcuate contacts simultaneously or either of them selectively.

In testimony whereof I affix my signature.

WILLIAM P. BUTT.